(12) United States Patent
Chae et al.

(10) Patent No.: US 11,409,298 B2
(45) Date of Patent: Aug. 9, 2022

(54) METHOD AND REMOTE CONTROL DEVICE FOR RECONFIGURING TRAVEL ROUTE OF OBJECTS BY REFLECTING PREDICTED RISK LEVEL TO RISK MAP

(71) Applicant: HANWHA DEFENSE CO., LTD., Changwon-si (KR)

(72) Inventors: Hee Seo Chae, Changwon-si (KR); Sang Woong Park, Changwon-si (KR); Min Hyeok Kwon, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 246 days.

(21) Appl. No.: 16/788,707

(22) Filed: Feb. 12, 2020

(65) Prior Publication Data
US 2021/0072755 A1   Mar. 11, 2021

(30) Foreign Application Priority Data
Sep. 11, 2019   (KR) .......................... 10-2019-0113027

(51) Int. Cl.
*G05D 1/02*   (2020.01)
*G01C 21/34*   (2006.01)
*G01S 13/78*   (2006.01)
*B60W 60/00*   (2020.01)
*G01C 21/36*   (2006.01)

(52) U.S. Cl.
CPC ....... *G05D 1/0214* (2013.01); *B60W 60/0011* (2020.02); *G01C 21/3415* (2013.01); *G01C 21/3461* (2013.01); *G01C 21/362* (2013.01); *G01S 13/78* (2013.01); *B60W 2300/26* (2013.01)

(58) Field of Classification Search
CPC ............ G05D 1/0214; B60W 60/0011; B60W 2300/26; G01C 21/3415; G01C 21/3461; G01C 21/362; G01S 13/78
See application file for complete search history.

(56) References Cited

U.S. PATENT DOCUMENTS

| 6,317,690 B1 * | 11/2001 | Gia ....................... G01S 13/935 701/301 |
| 6,687,606 B1 * | 2/2004 | Moitra ................. G06Q 10/047 342/26 R |

(Continued)

FOREIGN PATENT DOCUMENTS

| KR | 10-1307272 B1 | 9/2013 |
| KR | 10-1620983 B1 | 5/2016 |
| KR | 10-1840540 B1 | 3/2018 |

*Primary Examiner* — Jeff A Burke
*Assistant Examiner* — Joshua Alexander Garza
(74) *Attorney, Agent, or Firm* — Sughrue Mion, PLLC

(57) ABSTRACT

According to a non-limiting example embodiment, a remote control device includes a display configured to display a risk map; an input interface configured to input a travel route for an object to move along; a computing device, including at least one processor, the computing device configured to: receive obstacle information detected as the object moves along an actual travel route based on the travel route, and receive route information of the actual travel route of the object; and reset the travel route inputted by the input interface to a reset travel route in real time based on a mission given to the object or a risk level in each of a safe area and a dangerous area displayed on the risk map.

18 Claims, 15 Drawing Sheets

(56) References Cited

U.S. PATENT DOCUMENTS

| | | | | |
|---|---|---|---|---|
| 7,194,353 | B1* | 3/2007 | Baldwin | G08G 5/0013 |
| | | | | 701/528 |
| 7,756,635 | B2* | 7/2010 | Milbert | G01C 21/20 |
| | | | | 701/416 |
| 9,558,672 | B2* | 1/2017 | McCann | G08G 5/006 |
| 10,032,381 | B2* | 7/2018 | Gagliardi | G08G 3/02 |
| 2003/0212478 | A1* | 11/2003 | Rios | G05D 1/0094 |
| | | | | 701/2 |
| 2006/0031004 | A1* | 2/2006 | Lundberg | G01C 21/20 |
| | | | | 701/533 |
| 2009/0326735 | A1* | 12/2009 | Wood | G05D 1/0088 |
| | | | | 701/2 |
| 2010/0145552 | A1* | 6/2010 | Herman | G08G 5/0034 |
| | | | | 701/3 |
| 2012/0065881 | A1* | 3/2012 | McIver | G05D 1/0088 |
| | | | | 701/467 |
| 2016/0146622 | A1* | 5/2016 | Rosswog | G01C 21/20 |
| | | | | 701/418 |
| 2018/0113460 | A1* | 4/2018 | Koda | G08G 1/096866 |
| 2020/0117900 | A1* | 4/2020 | Deng | H04W 4/026 |

* cited by examiner

METHOD AND REMOTE CONTROL DEVICE FOR RECONFIGURING TRAVEL ROUTE OF OBJECTS BY REFLECTING PREDICTED RISK LEVEL TO RISK MAP

CROSS-REFERENCE TO RELATED APPLICATION

This application claims the benefit of Korean Patent Application No. 10-2019-0113027, filed on Sep. 11, 2019, in the Korean Intellectual Property Office, the disclosure of which is incorporated herein in its entirety by reference.

BACKGROUND

1. Field

The disclosure relates to a method of configuring a risk map to be used in the military and, more specifically, to a method for reconfiguring a route in real time based on a predicted risk level.

2. Description of Related Art

In autonomous driving, unmanned ground vehicles and unmanned robots configure a moving route through route planning and travel along the moving route. The route planning includes global route planning that configures a global route with a given map and local route planning that recognizes an environment from sensor values and reaches a target point.

The global route planning refers to configuration of a connected route by dividing a route planning target region into a plurality of areas and selecting areas to reach a target point at the lowest cost with respect to cost information input to each area. Although various methods, such as Voronoi diagrams, gradient methods, and A* algorithms, have been developed for the global route planning, it is necessary to reconfigure a route when a vehicle deviates from the route or a new obstacle is found, and thus it is difficult to apply changes in real time.

In the case of the local route planning, the vehicle is driven on a travel route configured based on GPS by using environmental information data, thereby enabling more stable driving than the global route planning. However, even in the case of the local route planning, the travel route is set using only environmental information data acquired from the unmanned ground vehicles and the unmanned robots, and thus it is difficult to set a travel route adapted to risks occurring or detected in real time.

SUMMARY

Embodiments of the disclosure aim to improve the viability of an unmanned combat system by predicting the risk of a traveling environment which changes in real time when using the unmanned combat system under a military operation environment.

Embodiments of the disclosure aim to secure the safety of the unmanned combat system by identifying a dangerous area through search using the unmanned combat system and reconfiguring an existing search route of the unmanned combat system based on the identified information.

Additional aspects will be set forth in part in the description which follows and, in part, will be apparent from the description, or may be learned by practice of the presented embodiments of the disclosure.

According to a non-limiting example embodiment, a method for reconfiguring a travel route of friendly resource objects based on a predicted risk level associated with a risk map under a military operation environment comprises the steps of: grasping friendly resource objects; grasping the topography of a region where the risk map is to be generated; classifying a safe area and a dangerous area in the region based on a shape of the topography grasped in the region and a result of searching the friendly resource objects and displaying the classified safe area and dangerous area on the risk map; displaying a travel route in the safe area and a travel route in the dangerous area for each object on the risk map; and updating the risk map by changing the configured travel route in the safe area and travel route in the dangerous area in real time when the safe area and the dangerous area are changed.

According to a non-limiting example embodiment, the risk map may display at least one of the shortest travel route reflecting the tomography and a travel route reset in consideration of a safety level within the dangerous area.

According to a non-limiting example embodiment, for each of the friendly resource objects, a travel route to move in the risk map may be displayed differently according to at least one of a type of the object, a mission given to each object, an urgency of the mission, and a moving speed of the object.

According to a non-limiting example embodiment, the remote control device comprises: a display configured to display a risk map; an input interface configured to input a travel route to which an object moves; a receiving unit configured to receive obstacle information detected as the object actually moves the travel route, and an actual travel route; and a rerouting unit configured to reset the input travel route in real time based on a mission given to the object or a risk level in each of a safe area and a dangerous area displayed on the risk map.

According to a non-limiting example embodiment, the remote control device displays a safe area and a dangerous area on the risk map for a specific region where topographic information, enemy resource information, and information about risk factors are not provided, based on a result of detection by which each of the friendly resource objects conducts a search, and updates the safe area and the dangerous area at every search cycle.

According to a non-limiting example embodiment, the remote control device updates the safe area and the dangerous area by displaying, in real time, a surveillance range of each friendly resource object and a risk range of each enemy resource object on the risk map for a specific region where topographic information, enemy resource information, and information about risk factors are provided.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
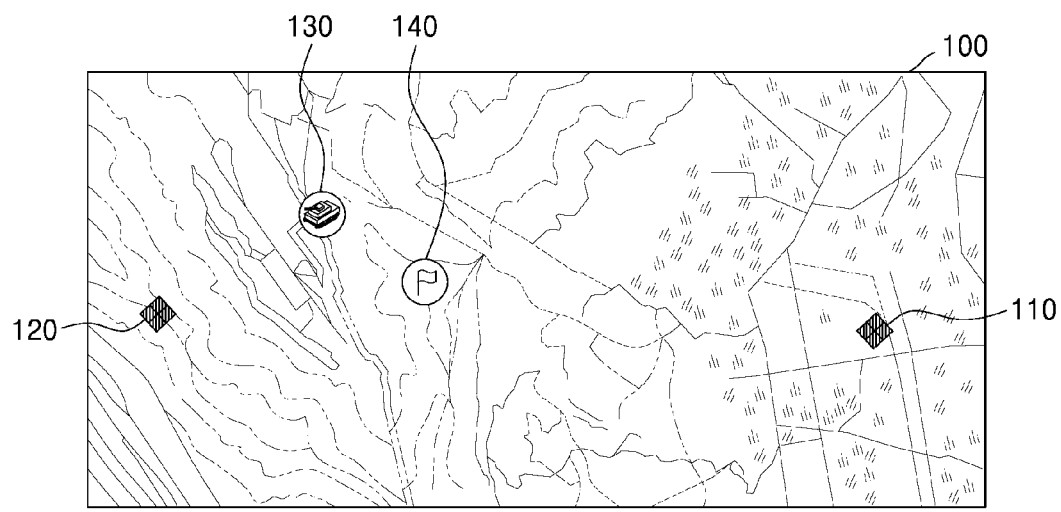
FIG. 1A illustrates an initial step of generating a risk map of a known region according to non-limiting example embodiments of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

When unmanned ground vehicles, unmanned robots, and unmanned aerial vehicles are used as an unmanned combat system under a military operation environment, missions such as proximity control, remote control, autonomous driving, and the like may be performed. Objects used in the unmanned combat system travel along a given travel route when performing these tasks. In general, for a route to be traveled for the first time, the unmanned ground vehicles, the unmanned robots, and the unmanned aerial vehicles move along a travel route that can be traveled based on GPS, and may travel more stably for the next time traveling by using information about the travel route once taken through remote driving or autonomous driving. In this case, detailed information about obstacles detected during remote driving or autonomous driving, environmental information, and the like may be used. However, when the unmanned combat system is used under the military operation environment only by this method, it is difficult to ensure the viability and stability of the unmanned combat system due to being unable to grasp the degree of risk of an operation environment which changes in real time because remote driving or autonomous driving is performed without significantly changing the initial travel route.

According to a non-limiting example embodiment, a risk map, which predicts or detects the degree of risk of a region where an unmanned combat system is operated on a search cycle basis or in real time and guides the unmanned combat system, is prepared. The risk map may display information such as risk factors identified in an operation environment, movement ranges of enemies according to time, safe areas and dangerous areas, travel routes on which friendly resource objects may travel, and the like. In addition, when the safe areas and the dangerous areas are changed, information in which the travel route of each of the friendly resource objects is reset may be displayed based on the changed degree of risk in real time.

According to a non-limiting example embodiment of the disclosure, the remote control device (900 of FIG. 9) may receive or transmit messages in Korean variable message format (KVMF) and other various formats from or to upper echelons, and may perform wired/wireless communication with a server in which weapon system information is internally constructed.

According to a non-limiting example embodiment of the disclosure, an unmanned system using the risk map comprises a remote control device (see 900 of FIG. 9), an unmanned ground vehicle, an unmanned robot, and an unmanned aerial vehicle. The remote control device uses a risk map, and the risk map (910 of FIG. 9) may continuously display a surveillance range 920 according to moving routes and travel routes of the friendly resource objects, and may continuously display a dangerous area 930 that may be attacked by enemy weapons according to the moving routes and the travel routes of the enemy resource objects.

In the unmanned system, the remote control device may remotely control at least one unmanned ground vehicle, unmanned robot, and unmanned aerial vehicle. In addition, the unmanned system may be implemented to update detailed information about the safe areas, the dangerous areas, the topography, and the obstacles on the risk map based on sensor data obtained while at least one unmanned vehicle, unmanned robot, and unmanned aerial vehicle is searching.

Hereinafter, this will be described with reference to the drawings.

FIGS. 1A to 38 illustrate non-limiting example embodiments of the disclosure, and more particularly, illustrate examples of configuring a risk map in a known region.

Figure 1B:
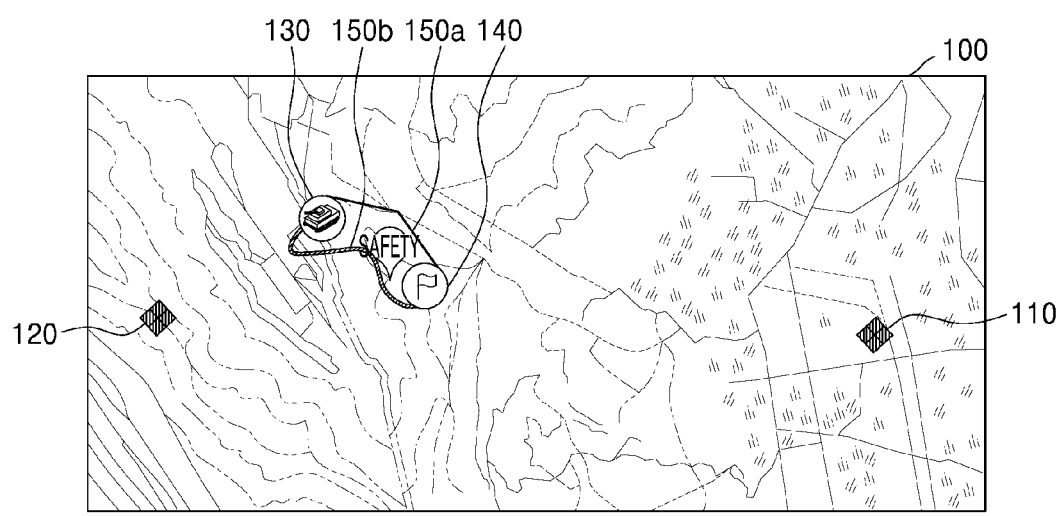
FIG. 1B illustrates an example of configuring the risk map of FIG. 1A according to non-limiting example embodiments of the disclosure.
Figure 2A:
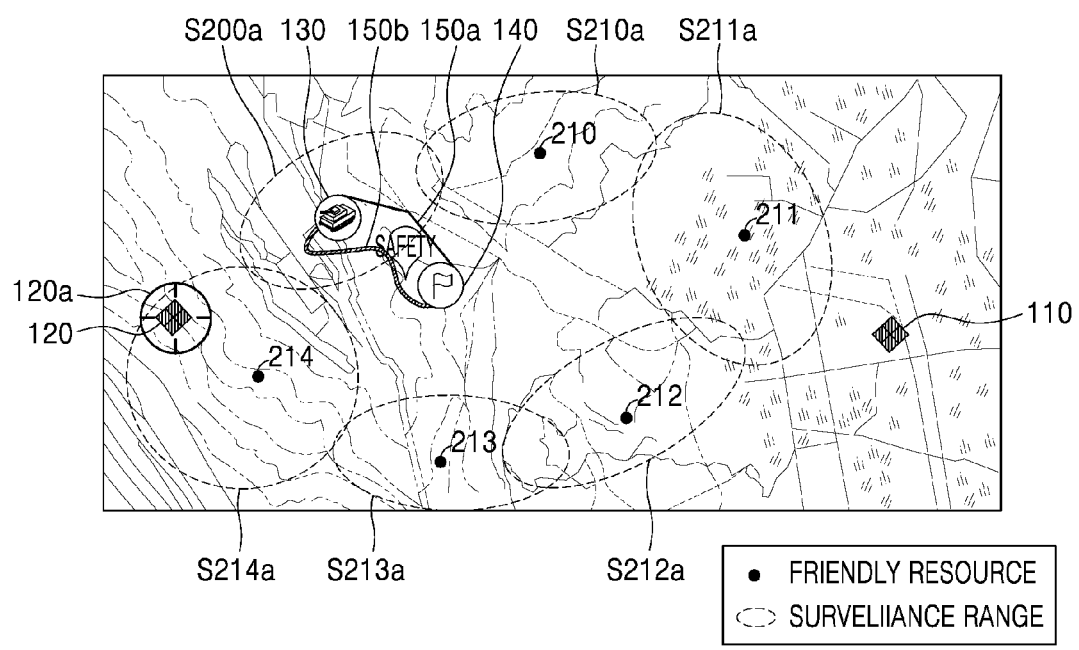
FIG. 2A illustrates an example, according to a non-limiting example embodiment of the disclosure, of updating the risk map of FIG. 1A based on risk factors recognized by friendly resources in a known region.
Figure 2B:
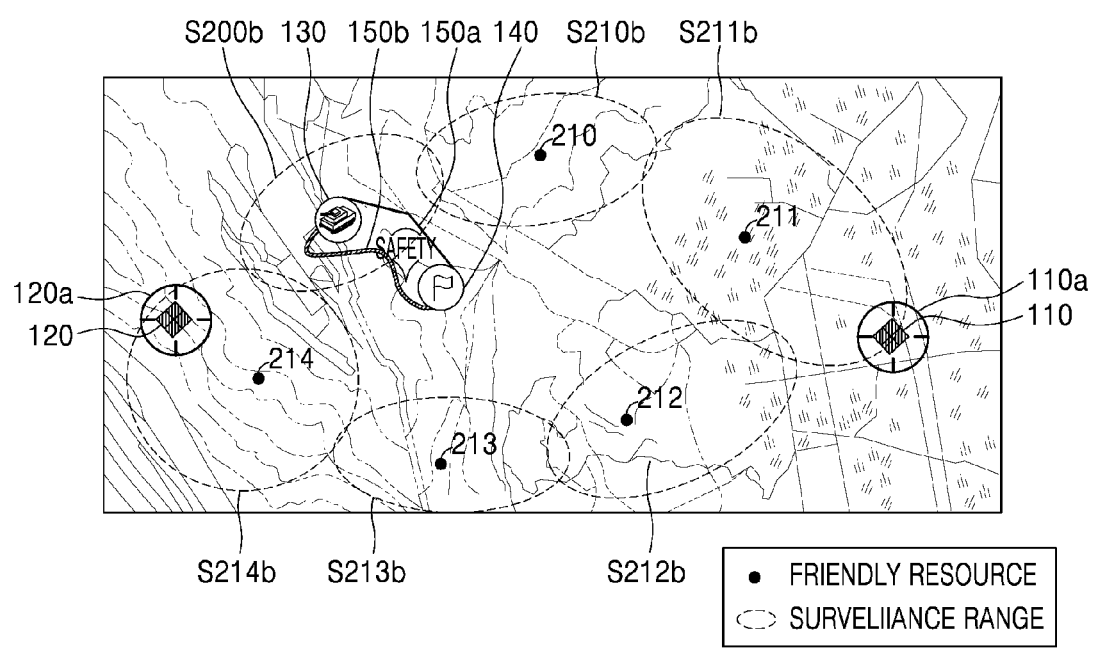
FIG. 2B illustrates an example, according to a non-limiting example embodiment of the disclosure, of continuously updating risk information based on a search cycle.
Figure 3A:
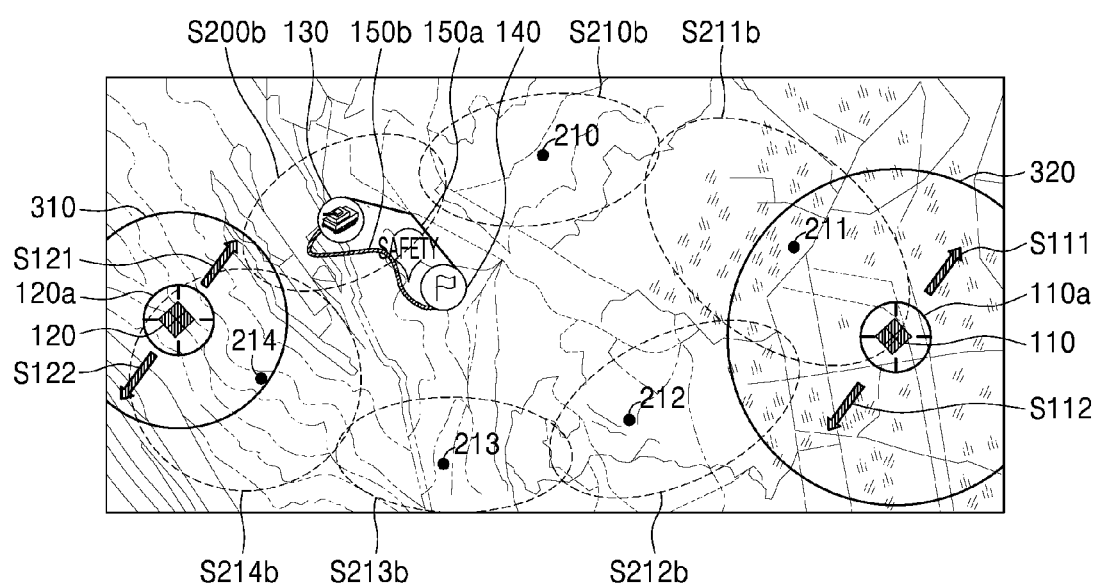
FIG. 3A illustrates an example, according to a non-limiting example embodiment of the disclosure, of updating the risk map of FIG. 1A based on risk factors according to enemy resources and enemy movement in a known region.
Figure 3B:
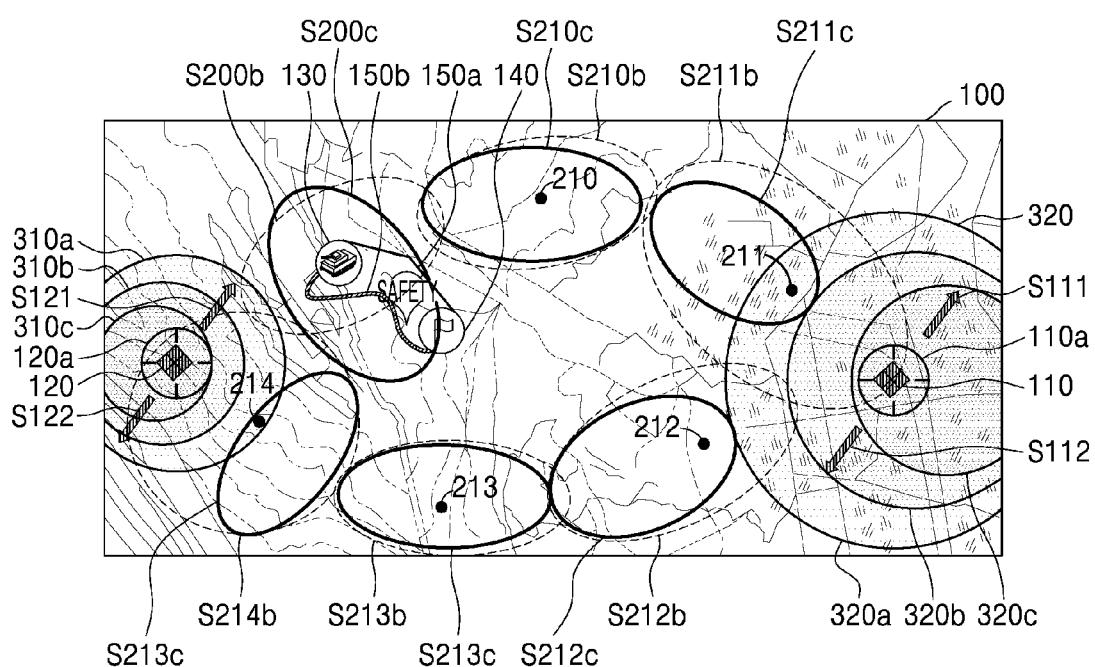
FIG. 3B illustrates an example, according to a non-limiting example embodiment of the disclosure, of continuously updating risk information based on a search cycle.

FIGS. 1A-B illustrate an example of creating an initial risk map for the known region using a map database, and FIGS. 2A and 2B illustrate an example of displaying friendly resources on the risk map, and when enemy resources 110 and 120 are actually identified by the friendly resources through a search, displaying actual identifications 110a and 120a on the risk map in real time. FIGS. 3A and 3B illustrate an example of updating the enemy resources, a moving direction of the enemy resources, and other risk factors in the risk map in real time or on a search cycle basis, and adjusting a moving direction and a monitoring direction of the friendly resources in real time or on a search cycle basis based on the risk factors in the risk map. The friendly resources or the enemy resources refer to information about the deployment, type, and quantity of weapon systems.

FIG. 1A illustrates an initial step of generating a risk map 100 for a known region, displaying a friendly resource 130 (e.g. an unmanned ground vehicle) and enemy resources 110 and 120 by using GPS information on a map obtained from a map database in which maps, military maps, and the like are previously stored. Also, a target spot 140 to be moved may be displayed.

Referring to FIG. 18, the remote control device inputs, via a user interface to the risk map 100, a moving route 150a on which a friendly resource 130 (e.g. an unmanned ground vehicle), which is an object that may be used by the friendly forces, travels. The input interface may be a keyboard, a mouse, a stylus, a user's finger, a display, or the like.

The friendly resource 130 (e.g. an unmanned ground vehicle) causes to display, on the risk map 100, an actual movement route 150b actually traveled while avoiding actual road environments and obstacles in the course of traveling based on the input moving route 150a. In this case, the friendly resource 130 (e.g. an unmanned ground vehicle) may transmit coordinates of an important obstacle recognized through sensors (816, 826 of FIG. 8) such as pre-installed 3D lidar or the like to the remote control device (900 of FIG. 9), and the risk map 100 may further display received coordinates of the obstacles. Examples of the obstacles may include fire, water, puddles, cliffs, tactical barbed wires, a single fence, a double fence, unclear mines, antipersonnel mines, antitank mines, or the like. In this case, the risk map 100 shown in FIG. 1B provides information about an actual movement route 150b, which reflects the travel route avoiding the actual road environments and the obstacles, instead of a straight movement along moving route 150a on the map, and the information about the actual movement route 150b may be reused thereafter.

FIG. 2A illustrates a non-limiting example embodiment of the disclosure, and more particularly, illustrates an example of updating the risk map based on risk factors recognized by friendly resources in a known region, and FIG. 2B illustrates a non-limiting example embodiment of the disclosure, and more particularly, illustrates an example of continuously updating risk information based on a search cycle.

FIG. 2A illustrates an example of friendly resources 130, 210, 211, 212, 213, and 214, surveillance ranges S200a, S21a, S211a, S212a, S213a, and S214a of each of the friendly resources 130, 210, 211, 212, 213, and 214, and an actual identification 120a of the enemy resources by the friendly resources 130, 210, 211, 212, 213, and 214 in the risk map of FIGS. 1A to 1B, at a first time t1.

Examples of the friendly resources 210 to 214 may include unmanned ground vehicles, personal soldiers, unmanned aerial vehicles, armors, infantrymen, military engineers, artillerymen, chemicals, biological and radiological weapons, or the like. The surveillance range of the friendly resources may be, for example, 4 km for unmanned ground vehicles, 1 km for individual soldiers, 1 km for unmanned aerial vehicles, or the like. According to a non-limiting example embodiment, a surveillance range of a friendly object may be set by further considering a time that may be retained for each friendly object.

FIG. 2B is an example of a case where, when the existence of an unidentified enemy resource 110 is identified as the surveillance ranges S200b, S210b, S211b, S212b, S213b, and S214b are partially changed through a movement of the friendly resources, the risk map 100 is updated because unidentified risk factors are identified. For example, the identified enemy resource 110 may be shown by an identifier 110a on the risk map 100. According to a non-limiting example embodiment, information about the friendly resources may be updated to the risk map in real time or in a search cycle of about, for example, 10 minutes (TBD).

FIG. 3A illustrates a non-limiting example embodiment of the disclosure, and more particularly, illustrates an example of updating the risk map based on risk factors according to enemy resources 110 and 120 and enemy movement directions S111, S112, S121, and S122 in a known region, and FIG. 3B illustrates a non-limiting example embodiment of the disclosure, and more particularly, illustrates an example of continuously updating risk information based on a search cycle. The risk map may display, with respect to the enemy movement directions S111, S112, S121, and S122, an actually detected moving direction of the enemy or a moving direction in which the enemy is expected to move based on the topography.

According to a non-limiting example embodiment, the risk map may be displayed by predicting potential risk ranges 310 and 320 based on a moving speed and a monitoring performance of the enemy resources 110 and 120. In this case, a moving direction and a movable distance of the enemy resources 110 and 120 or potential risk factors that may occur in the enemy may be displayed on the risk map.

According to a non-limiting example embodiment, the risk map may be continuously updated to display the risk information according to the search cycle. Referring to FIG. 3B, when a moving radius is changed, as indicated by risk ranges 310a, 310b, 310c, 320a, 320b, and 320c, as the enemy resources 110 and 120 move, the surveillance ranges S200c, S210c, S211c, S212c, S213c, and S214c that can be monitored by each of the friendly resources 130, 210, 211, 212, 213, and 214 may be changed based on a risk level and displayed.

According to a non-limiting example embodiment, when a first enemy resource 110 and a second enemy resource 120 move, the surveillance ranges S200c, S210c, S211c, S212c, S213c, and S214c corresponding to the safe area that can be monitored by each of the friendly resources 130, 210, 211, 212, 213, and 214 may be changed and displayed based on the risk ranges 310a, 310b, 310, 320s, 320b, and 320c changed according to the moving direction and the moving speed. In addition, when the friendly resource is within the risk range, an additional route may be reset and displayed on the risk map such that the friendly resource may escape from the risk range.

For example, the risk map may be updated to display the surveillance range of the friendly resource 130 (e.g. an unmanned ground vehicle) of the friendly forces from a surveillance range of a first time (S200b of FIG. 3A) to a surveillance range of a second time (S200c of FIG. 3B) according to the movement of the second enemy resource 120.

When there are risk factors such as enemy resources, fire, bombs, or the like, the risk map (or portions thereof such as a surveillance range or an indicator of a friendly resource) may be displayed in a darker color when closer to the risk factors, and in a lighter color when getting farther away from the risk factors. When the friendly resource needs to enter the risk range for surveillance, the route may be set to preferentially enter a dangerous area with a relatively low risk level, displayed in a lighter color.

Figure 4:
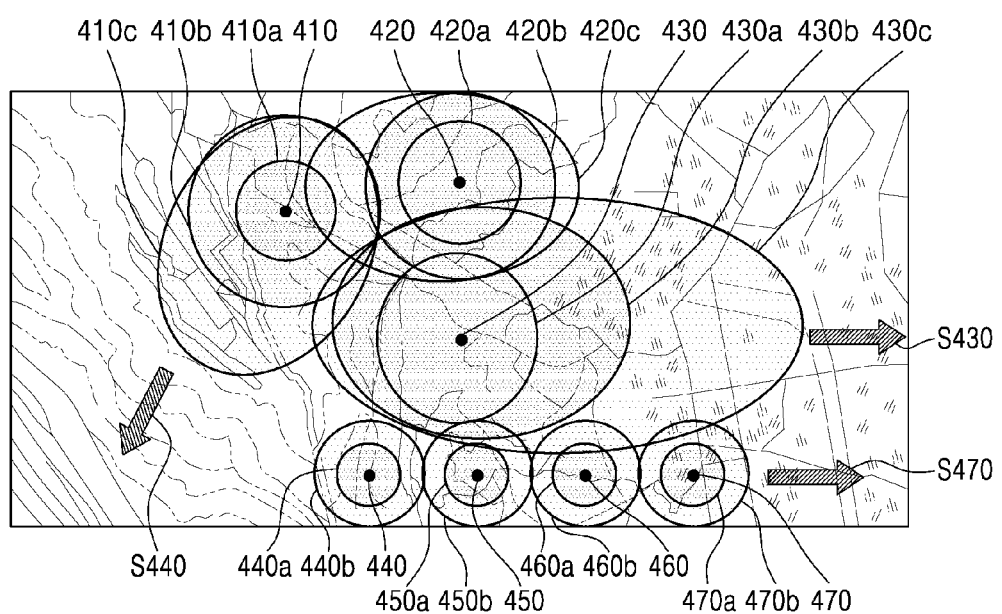
FIG. 4 illustrates an example of configuring a risk map of an unknown region according to a non-limiting example embodiment of the disclosure.

FIGS. 4 and 5 illustrate other non-limiting example embodiments of the disclosure, and more particularly, illustrate an example of configuring a risk map in an unknown region. The unknown region includes all of regions without map data, regions without war-related data, regions without environmental data including topography, weather, and the like, and regions without data regarding enemies.

FIG. 4 illustrates a non-limiting example embodiment of the disclosure, and more particularly, illustrates an example of friendly resources to determine and set a risk level while patrolling in all directions in the unknown region. The friendly resources 410, 420, 430, 440, 450, 460, and 470 start to determine the risk level when enemy resources or risk factors are sensed while changing the patrol range. The determination of the risk level may be different for each time.

The friendly resources 410, 420, 430, 440, 450, 460, and 470 include unmanned ground vehicles, unmanned aerial vehicles, unmanned robots, soldiers, and the like, and a patrol radius of each object may be different according to a type of the friendly resources 410, 420, 430, 440, 450, 460, and 470.

For example, it is indicated that a friendly resource 410 (e.g. a first unmanned vehicle) is moving in a first direction S440 and is expanding patrol ranges 410a, 410b, and 410c. A friendly resource 420 (e.g. a second unmanned vehicle) may also change patrol ranges 420a, 420b, and 420c and may patrol an area that overlaps the area patrolled by the first friendly resource 410. As a friendly resource 430 (e.g. a first unmanned aerial vehicle) moves in a second direction S430 and four friendly resource 440, 450, 460 and 470 (e.g. unmanned robots) move in a third direction S470, each patrol range 430a, 430b, 430c, 440a, 440b, 450a, 450b, 460a, 460b, 470a, and 470b may be changed.

FIG. 5A to 5D illustrate other non-limiting example embodiments of the disclosure, and more particularly, illustrate a process of determining a risk level to be displayed on risk maps 500a, 500b, 500c, and 500d, respectively, based on the moving ability for each friendly resource from the farthest boundary line in the unknown region.

Figure 5A:
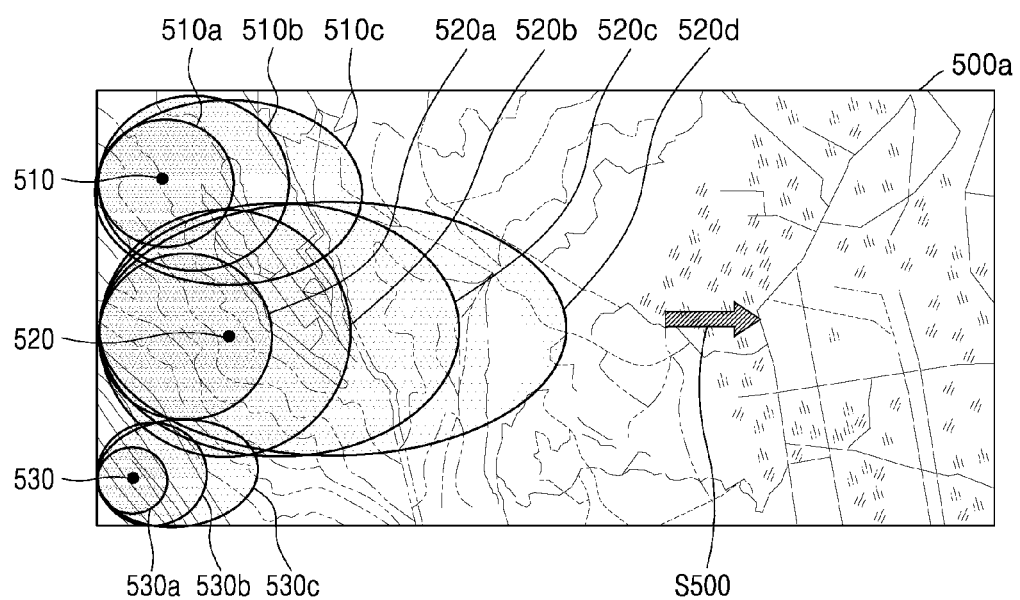
FIG. 5A illustrates an example of configuring a risk map of an unknown region according to a non-limiting example embodiment of the disclosure.

Referring to FIG. 5A, the friendly objects 510, 520, and 530 may change or expand a moving direction S500 and patrol ranges 510a, 510b, 510c, 520a, 520b, 520c, 520d, 530a, and 530b, and 530c while starting patrol from a boundary point on a map.

Figure 5B:
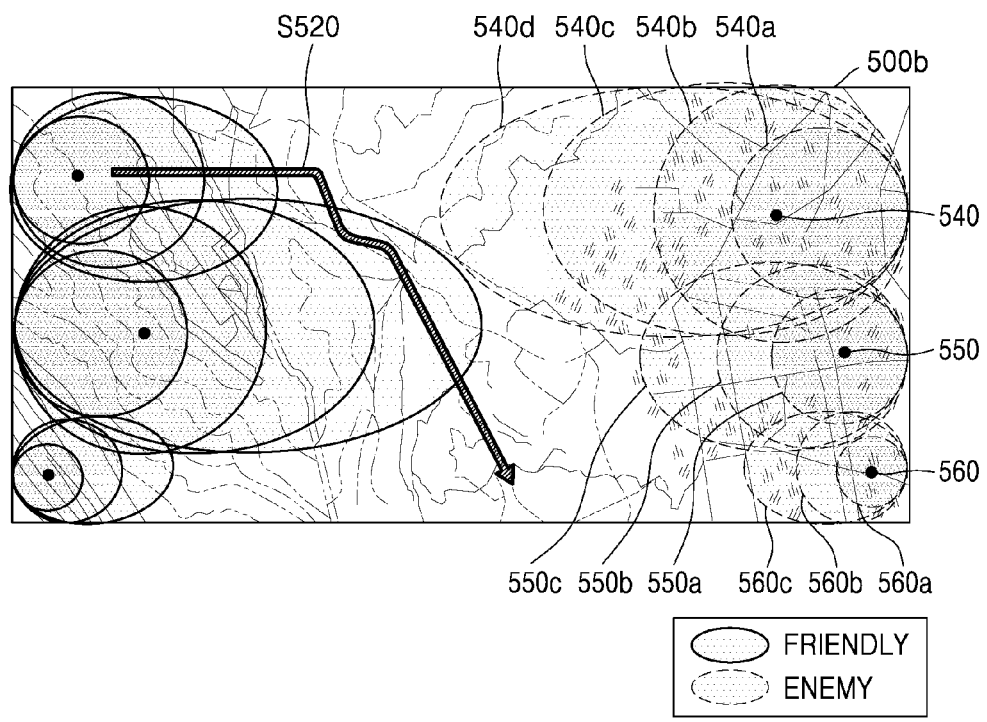
FIG. 5B illustrates an example of configuring a risk map of an unknown region according to a non-limiting example embodiment of the disclosure.

Referring to FIG. 5B, the risk map 500b stochastically indicates regions 540 and 550 where the enemy resources are present in the unknown region, a region 560 where enemy soldiers are present, and regions 540a, 540b, 540c, 540d, 550a, 550b, 550c, 560a, 560b, and 560c, corresponding to dangerous areas, where various risk factors are present. Thereafter, the risk map may provide an initial travel route S520 that may be movable for each friendly resource object.

The risk map 500b may display the regions 540a, 540b, 540c, 540d, 550a, 550b, 550c, 560a, 560b, and 560c, that correspond to dangerous areas, by risk level. According to a non-limiting example embodiment, the risk level may be classified into 0 to 10 levels in accordance with the location of the enemy resources, the topography, and the degree of influence of the risk factors. It is possible to set 0 as the lowest risk level and 10 as the highest risk level, or this may be changed by setting 0 as the highest risk level and 10 as the lowest risk level according to set criteria.

For example, the risk level may be classified according to preset criteria, such as a risk level of 10 when the enemy resources are microorganisms, a risk level of 9 for drones, a risk level of 8 for mines, and a risk level of 3 for trucks. According to a non-limiting example embodiment, different mission roles may be performed for each friendly object with reference to the risk level displayed on the risk map. For example, the travel route may be set such that an area with a high risk level (e.g., risk levels 8 to 10) is driven at a low speed, an area with an intermediate risk level (e.g., risk levels 5 to 7) is driven at a medium speed, and an area with a low risk level (e.g., risk levels 1 to 4) is driven at a low speed.

In addition, in an area determined as a safe area in the risk map, the degree of risk of missions assigned to the friendly resource objects may be different depending on an area with a high safety level, an area with an intermediate safety level, and an area with a low safety level. For example, the objects may be set to perform a high-risk fire operation mission only in the area with a high safety level and to perform low-risk complex monitoring in the area with a low safety level and a low risk level.

Figure 5C:
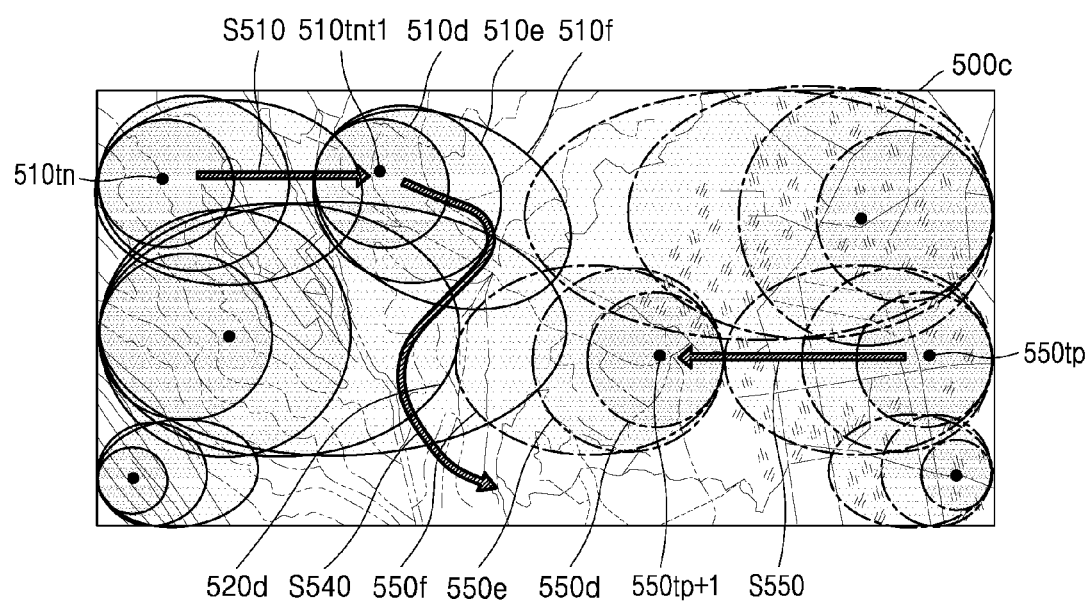
FIG. 5C illustrates an example of configuring a risk map of an unknown region by resetting a travel route of friendly objects according to a change in the dangerous area, according to non-limiting example embodiments of the disclosure.

FIG. 5C illustrates an example of resetting a travel route S520 of FIG. 5B, to a travel route including travel routes S510 and S540, of the friendly objects according to a change in the dangerous area. When the dangerous area is changed (e.g. change between risk areas 550d, 5/50e, 550f) while the friendly objects execute a search, or a message indicating that an attack range of the enemies is changed is received from a detection system of the higher system, the risk map 500c may display the dangerous area as changed, and each of the travel routes of the friendly objects may be reset based on the changed dangerous area.

For example, when the deployment of the enemy resources is changed or the dangerous area is changed while a friendly object 510 located at a first location at a tn time (represented by element 510tn) moves to a second location at a tn+1 time (represented by element 510tn1), the travel route of the friendly object 510 may be reset to the travel route S540 based on the changed dangerous area. In detail, when an enemy resource detected as located at a third location 550tp at a tp time is re-detected as located at a fourth location 550tp+1 at a tp+1 time after the enemy resource moves in the direction S550, and one or more of risk areas 550d, 550e, and 550f reach an area determined as a safe area (e.g. area 520d or area 510f), a new travel route S540 is configured by resetting an initial travel route S520 initially allocated to the friendly objects.

Figure 5D:
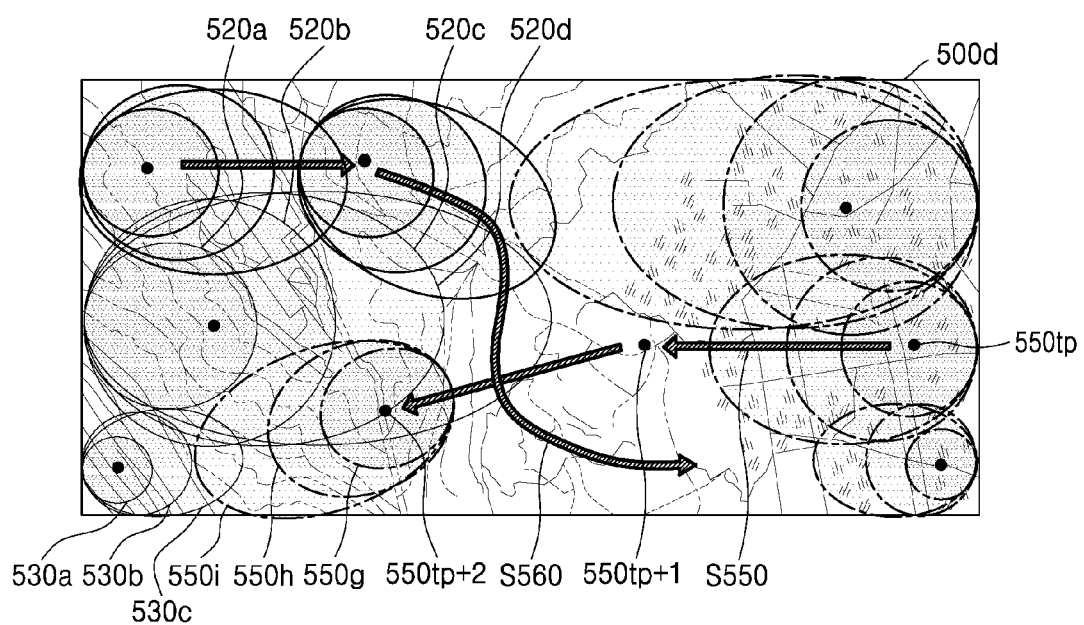
FIG. 5D illustrates an example of configuring a risk map of an unknown region, in which regions determined as safe areas may be changed to dangerous areas as time passes, according to non-limiting example embodiments of the disclosure.

FIG. 5D illustrates an example in which areas (e.g. 520a, 520b, 520c, and 520d of FIG. 5A) determined as safe areas may be changed to dangerous areas as time passes. When the enemy resource located at the third location 550tp at the tp time and at the fourth location 550tp+1 at the tp+1 time enters a fifth location 550tp+2, which was a safe area at a tp+2 time, the risk map 500d displays, as new dangerous areas, the areas 520a, 520b, 520c, 520d, 530a, 530b, and 530c of the friendly forces, which were previously considered safe. The areas 520a, 520b, 520c, 520d, 530a, 530b, and 530c of the friendly forces may be displayed as dangerous areas based on, for example, being overlapped by one or more of risk areas 550g, 550h, and 550i of the enemy forces. In this case, the risk map 500d may perform display in a separate color or a separate mark to inform that the safe area has been changed to the dangerous area. The risk map 500d may reset a travel route and display the travel route of each of the friendly objects even when the existing safe area is readjusted to the dangerous area. For example, the risk map 500d may reset a travel route and display a travel route S560 as a reset travel route. The friendly objects may perform autonomous driving along the initial travel route displayed on the risk maps 500a, 500b, 500c, and 500d or a reset travel route that is reset in real time, or the remote control device may transmit the initial travel route or the reset travel route in real time to the friendly objects to remotely control the travel route.

Figure 6:
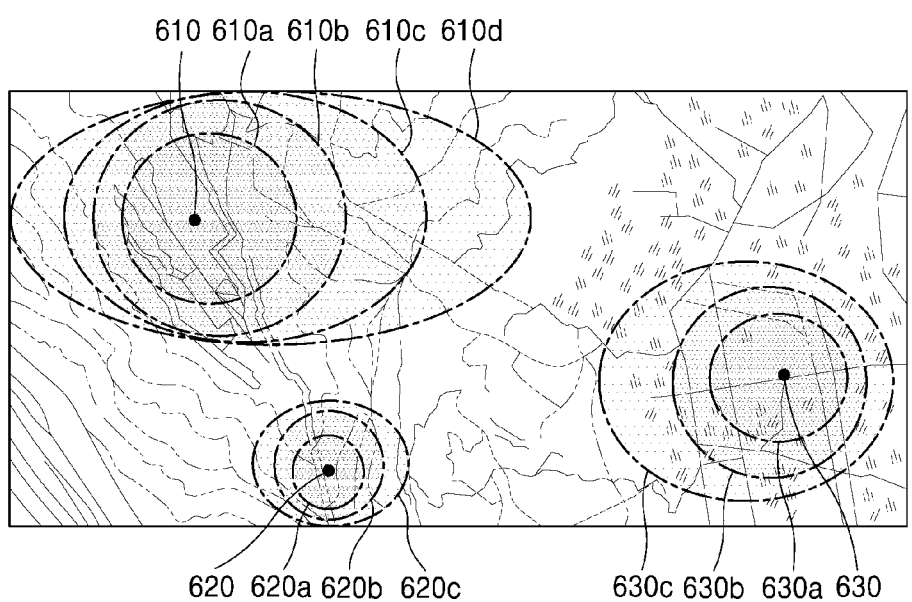
FIG. 6 illustrates an example of configuring a risk map when topographic information about a region is present but enemy resource information is not known, according to a non-limiting example embodiment of the disclosure.

FIG. 6 illustrates a non-limiting example embodiment of the disclosure, illustrating an example of configuring a risk map when topographic information about a region is present but enemy resource information is not known.

For illustrative purpose, FIG. 6 shows areas 520a, 520b, 520c, 520d, 530a, 530b, and 530c of the friendly forces When there is only topographic information about the region in the risk map and no information about the enemy resources, the friendly resources are identified and displayed on the risk map, and then a surveillance region of the friendly resources is displayed. Thereafter, after identifying the topography based on the topographic information on the corresponding region, preset deployment of the enemy resources corresponding to the topography is matched, and the risk levels are divided accordingly to display the dangerous areas on the map.

For example, in narrow mountainous areas with a lot of rocks, deployment of infantrymen (e.g. corresponding to element 620) among the enemy resources are matched, the risk level is set to be as low as 0-3, and the risk region is displayed in a small size (e.g. region 620a, 620b, or 620c). In roads or open fields, deployment of armored forces (e.g. corresponding to element 630) among the enemy resources are matched, the risk level is set to be as high as 8-10, and the risk region (e.g. region 630a, 630b, or 630c) is displayed in a medium size. In runways or landing pads at top of mountains, deployment of unmanned aerial vehicles (e.g. corresponding to element 610a) among the enemy resources are matched, the risk level is set to be as low as 2-4, and the risk region (e.g. region 610a, 610b, 610c, or 610d) is displayed in a large size such that a probabilistic risk level is displayed on the map. According to a non-limiting example embodiment, the risk level may be set to be proportional to a residence time of the enemy resources and inversely proportional to a distance from the center of the enemy resources.

Figure 7:
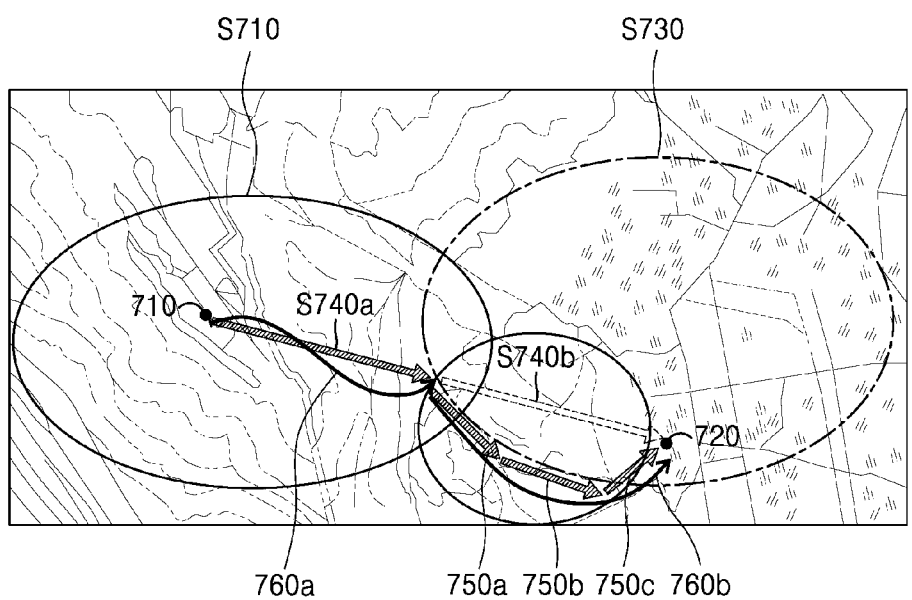
FIG. 7 illustrates an example of configuring a risk map by resetting and displaying travel routes, according to non-limiting example embodiments of the disclosure.

Thereafter, the risk map displays a first part S740a of a first travel route that is the shortest distance by which a friendly object 710 may move to a desired destination 720 within the safe area of region S710, as illustrated in the non-limiting example embodiment of FIG. 7. Thereafter, a second part S740b of the first travel route that is the shortest distance by which the friendly object 710 may move to the desired destination 720 within the dangerous area S730 is generated.

The risk map resets the second part S740b of the first travel route to the second travel routes 750a, 750b, and 750c through which the friendly object 710 may move considering the safety level within the dangerous area S730. Thereafter, corrected travel routes 760a and 760b obtained by correcting the first part S740a of the first travel route and the second travel routes 750a, 750b, and 750c, respectively, are generated and displayed considering topography within the safe area and the dangerous area.

According to a non-limiting example embodiment, the remote control device may select a travel route according to the mission assigned to the friendly object 710. For example, when an emergency movement of the friendly object 710 is required, the friendly object 710 is controlled to move through the second part S740b of the first travel route, the shortest distance in the dangerous area, not through a corrected travel route 760b in the dangerous area. However, when the emergency movement is not required, the friendly object is controlled to select and drive on the corrected travel route 760b that is a detour considering safety within the dangerous area. That is, a travel route to be traveled in the risk map may be displayed differently according to a given mission.

Figure 8:
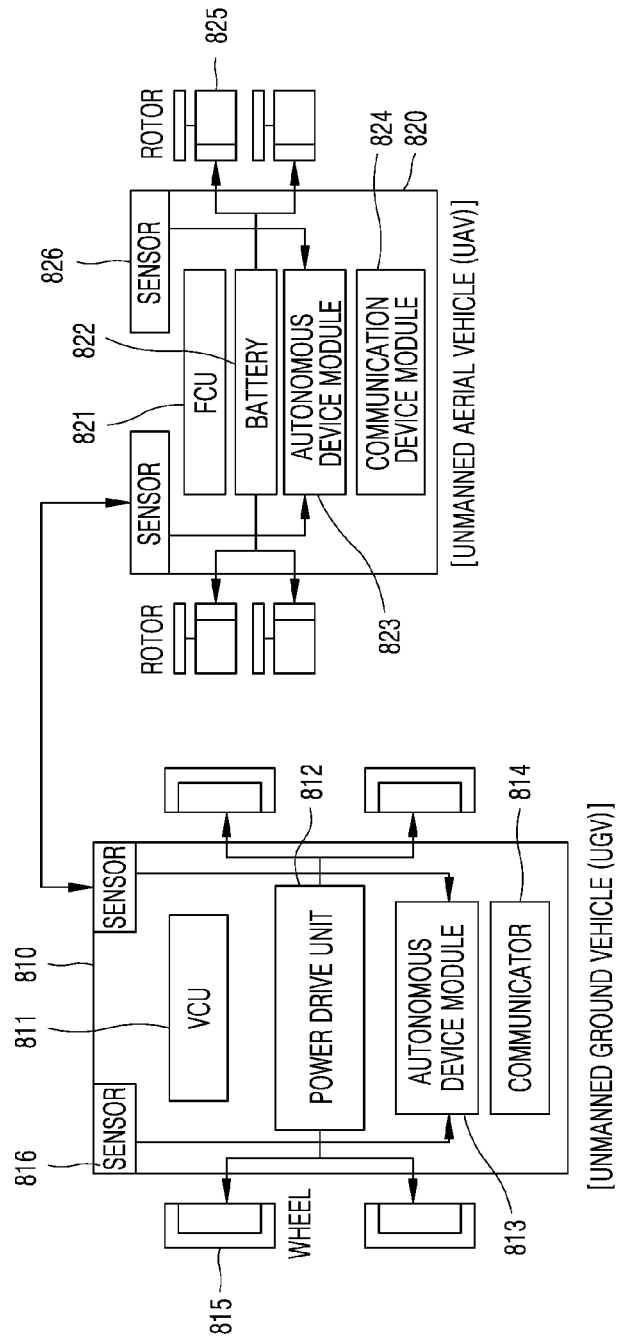
FIG. 8 illustrates an unmanned ground vehicle and an unmanned aerial vehicle according to non-limiting example embodiments of the disclosure.

FIG. 8 illustrates non-limiting example embodiments of the disclosure, and more particularly, illustrate an unmanned ground vehicle and an unmanned aerial vehicle. An unmanned ground vehicle 810 includes a vehicle control unit (VCU) 811 configured to control a driving command, a power drive device 812, an autonomous device module 813, a communication device module 814, a wheel 815, and a sensor 816 configured to secure topographic or environmental data. The unmanned aerial vehicle 820 includes a flight control unit (FCU) 821 configured to control a flight command, a battery 822, an autonomous device module 823, a communicator 824, a rotor 825, and a sensor 826 configured to secure topographic or environmental data.

Figure 9:
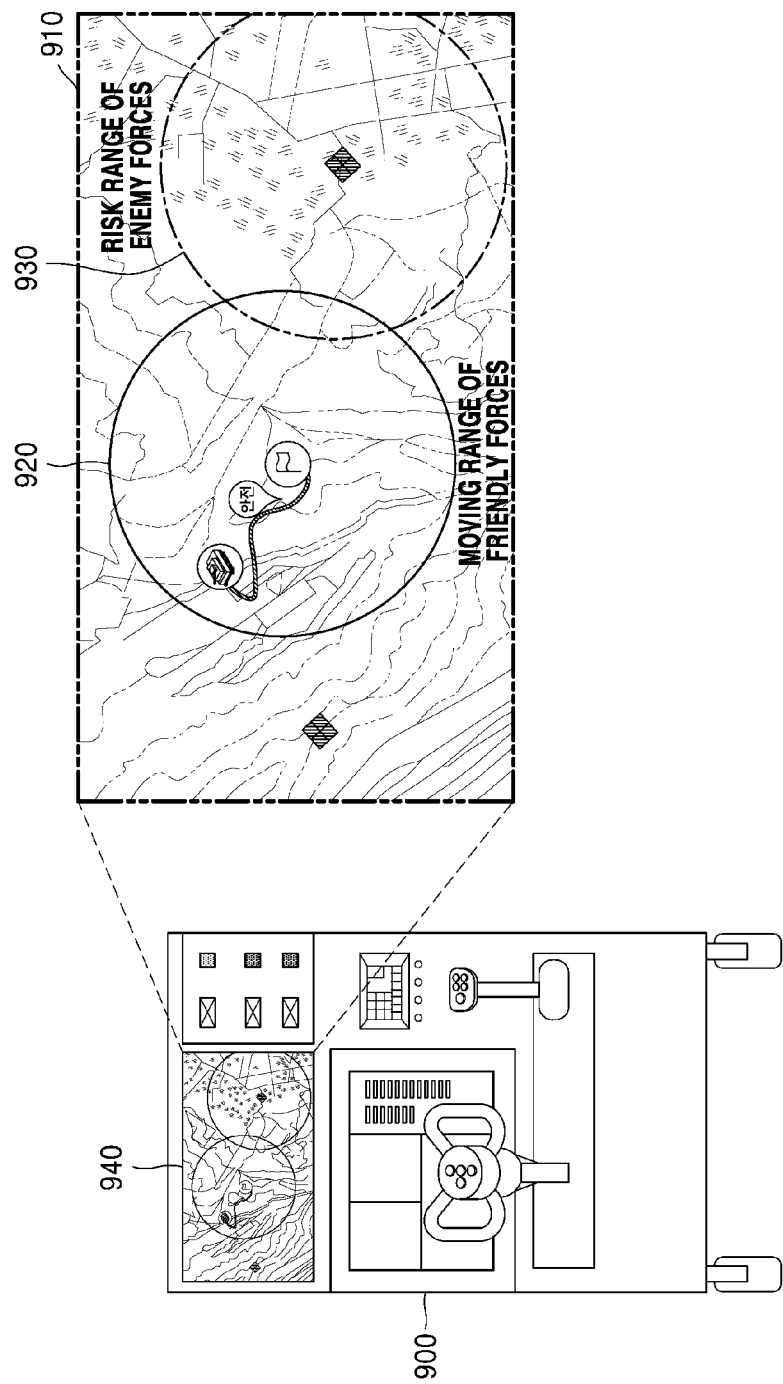
FIG. 9 illustrates an example of a remote control device, according to a non-limiting example embodiment of the disclosure.

FIG. 9 illustrates a non-limiting example embodiment of the disclosure, and more particularly, illustrates a remote control device 900 configured to remotely control unmanned ground vehicles, unmanned robots, unmanned aerial vehicles, and the like.

The remote control device 900 may update a risk map 910 based on data received from the unmanned ground vehicles, the unmanned robots, the unmanned aerial vehicles, and the like, and may receive messages such as missions to be assigned to an unmanned combat system from the upper echelons or may receive information related to enemy forces. Also, the remote control device 900 may perform wired/wireless communication with a server in which weapon system information is internally constructed. Further, the remote control device 900 may display a travel route changed according to a safe area and a dangerous area changed in real time in a battlefield on the risk map 910 in real time and back up corresponding data in real time in the server.

According to a non-limiting example embodiment, the remote control device 900 comprises: a display 940 configured to display a risk map 910; an input interface configured to input an initial travel route along which an object moves; a receiving unit configured to receive information on obstacles detected as the object actually moves along an initial travel route and a travel route; and a route reconfiguration unit configured to reset the input travel route in real time according to a mission given to the object or a risk level in each of a safe area and a dangerous area displayed on the risk map. Further, the remote control device 900 may further include an interface configured to control a moving speed and a moving direction of the unmanned ground vehicle, the unmanned robot, and the unmanned aerial vehicle in real time. According to non-limiting example embodiments, the remote control device 900 may comprise a computing device comprising at least one processor and memory including computer instructions. The computing device may be configured as the receiving unit and the route reconfiguration unit.

At least one of the components, elements, modules or units (collectively "components" in this paragraph) represented by a block in the drawings such as FIG. 8 may be embodied as various numbers of hardware, software and/or firmware structures that execute respective functions described above, according to an exemplary embodiment.

For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Embodiments of the disclosure include a computer-readable recording medium including a program command for performing an operation implemented by various computers. The computer-readable recording medium may include program commands, data files, data structures, or a combination thereof. The program commands recorded in the medium may be specially designed and configured for the disclosure or may be known and available to those skilled in the art of computer software. Examples of the computer-readable recording medium include magnetic media such as a hard disk, a floppy disk, and a magnetic tape, optical media such as a CD-ROM and a DVD, magneto-optical media such as a floptical disk, and hardware devices specially configured to store and perform program commands, such as ROM, RAM, a flash memory, and the like. Examples of the program commands include machine code such as that produced by a compiler, as well as high-level language code executable by a computer using an inter-printer or the like.

According to a non-limiting example embodiment, the method for reconfiguring a travel route of friendly resource objects based on a predicted risk level associated with a risk map under a military operation environment has an effect of improving the stability of an unmanned combat system by grasping existence of an enemy resource, a moving direction of the enemy resource, and an attack range due to the enemy resource in real time and resetting a travel route when using the unmanned combat system under the military operation environment.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the specification and following claims.

What is claimed is:

1. A method of reconfiguring travel routes of friendly resource objects based on a predicted risk level associated with a risk map under a military operation environment, the method comprising:
    identifying the friendly resource objects;
    obtaining topography of a region that the risk map is to include;
    classifying a safe area and a dangerous area within the region based on a shape of the topography of the region and a result of a search conducted by the friendly resource objects;
    displaying the safe area and the dangerous area, that are classified, on the risk map;
    displaying, on the risk map, a first travel route at least partially within the safe area for a friendly resource object of the friendly resource objects; and
    updating the risk map by changing, based on the dangerous area being changed, the first travel route of the friendly resource object in real time,
    wherein the classifying the safe area and the dangerous area comprises classifying areas into the safe area and the dangerous area by inferring deployment of enemy resources according to preset criteria based on the topography obtained.

2. The method of claim 1, further comprising:
    displaying a second travel route, of the friendly resource object, that is a shortest travel route to a destination.

3. The method of claim 1, wherein the updating the risk map comprises changing the first travel route based on a safety level within the dangerous area.

4. The method of claim 1, wherein the first travel route of the friendly resource object is displayed based on at least one of a type of the friendly resource object, a mission given to the friendly resource object, an urgency of the mission, and a moving speed of the friendly resource object.

5. The method of claim 1, further comprising:
    receiving information from the friendly resource objects about obstacles detected while traveling on respective travel routes, and further receiving information about an actual travel route from each of the friendly resource objects.

6. The method of claim 5, further comprises updating the risk map by displaying the actual travel route of the friendly resource object.

7. The method of claim 1, wherein the classifying the safe area and the dangerous area comprises classifying areas into the safe area and the dangerous area based on information received from the friendly resource objects, the information being information about enemy resources or risk factors detected in real-time by the friendly resource objects as the result of the search.

8. A remote control device comprising:
    a display configured to display a risk map;
    an input interface configured to input a travel route for an object to move along;
    a computing device, comprising at least one processor, the computing device configured to:
        receive obstacle information detected as the object moves along an actual travel route based on the travel route, and receive route information of the actual travel route of the object; and
        reset the travel route inputted by the input interface to a reset travel route in real time based on a mission given to the object or a risk level in each of a safe area and a dangerous area displayed on the risk map,
    wherein, for a specific region where only topographic information is provided, the computing device is configured to set the dangerous area in the specific region by inferring deployment of enemy resources based on the topographic information and further configured to display the dangerous area on the risk map.

9. The remote control device of claim 8, wherein the reset travel route is displayed on the risk map in real time.

10. The remote control device of claim 8, wherein, for a specific region where topographic information, enemy resource information, and information about risk factors are not provided, the computing device is configured to display the safe area and the dangerous area in the specific region on the risk map based on a result of detection by each of friendly resource objects conducting a search, and update the safe area and the dangerous area every search cycle of the friendly resource objects.

11. The remote control device of claim 8, wherein, for a specific region where topographic information, enemy resource information, and information about risk factors are provided, the computing device is configured to display a surveillance range of each of friendly resource objects, including the object, and a risk range of each of enemy resource objects on the risk map in real time to update the safe area and the dangerous area.

12. The remote control device of claim 8, wherein the computing device is configured to reset the travel route for the object based on whether the reset travel route is to be in the safe area or in the dangerous area.

13. The remote control device of claim 12, wherein the travel route for the object is reset based on topography.

14. The remote control device of claim 12, wherein the travel route for the object is reset based on a risk level.

15. A non-transitory computer-readable storage medium comprising instructions that are stored therein, the instructions configured to cause at least one processor to:
    identify friendly resource objects;
    obtain topography of a region that a risk map is to include;
    classify a safe area and a dangerous area within the region based on a shape of the topography of the region and a result of a search conducted by the friendly resource objects;
    display the safe area and the dangerous area, that are classified, on the risk map;
    display, on the risk map, a first travel route at least partially within the safe area for a friendly resource object of the friendly resource objects; and
    update the risk map by changing, based on the dangerous area being changed, the first travel route of the friendly resource object in real time,
    wherein the instructions are configured to cause the at least one processor to classify areas into the safe area and the dangerous area by inferring deployment of enemy resources according to preset criteria based on the topography obtained.

16. The non-transitory computer-readable storage medium of claim 15, wherein the instructions are further configured to cause the at least one processor to:
    display a second travel route, of the friendly resource object, that is a shortest travel route to a destination.

17. The non-transitory computer-readable storage medium of claim 15, wherein the instructions are configured to cause the at least one processor to update the risk map by changing the first travel route based on a safety level within the dangerous area.

18. The non-transitory computer-readable storage medium of claim 15, wherein the instructions are further configured to cause the at least one processor to:
    display an actual travel route of the friendly resource object based on receiving information about the actual travel route from the friendly resource object.

* * * * *